May 8, 1973

C. A. HEYNE 3,732,086

METHOD AND APPARATUS FOR RECOVERING
DISCRETE GOBS OF MOLTEN GLASS

Filed Dec. 28, 1970

INVENTOR
CLARENCE A. HEYNE

BY
ATTORNEY

INVENTOR
CLARENCE A. HEYNE
BY
ATTORNEY

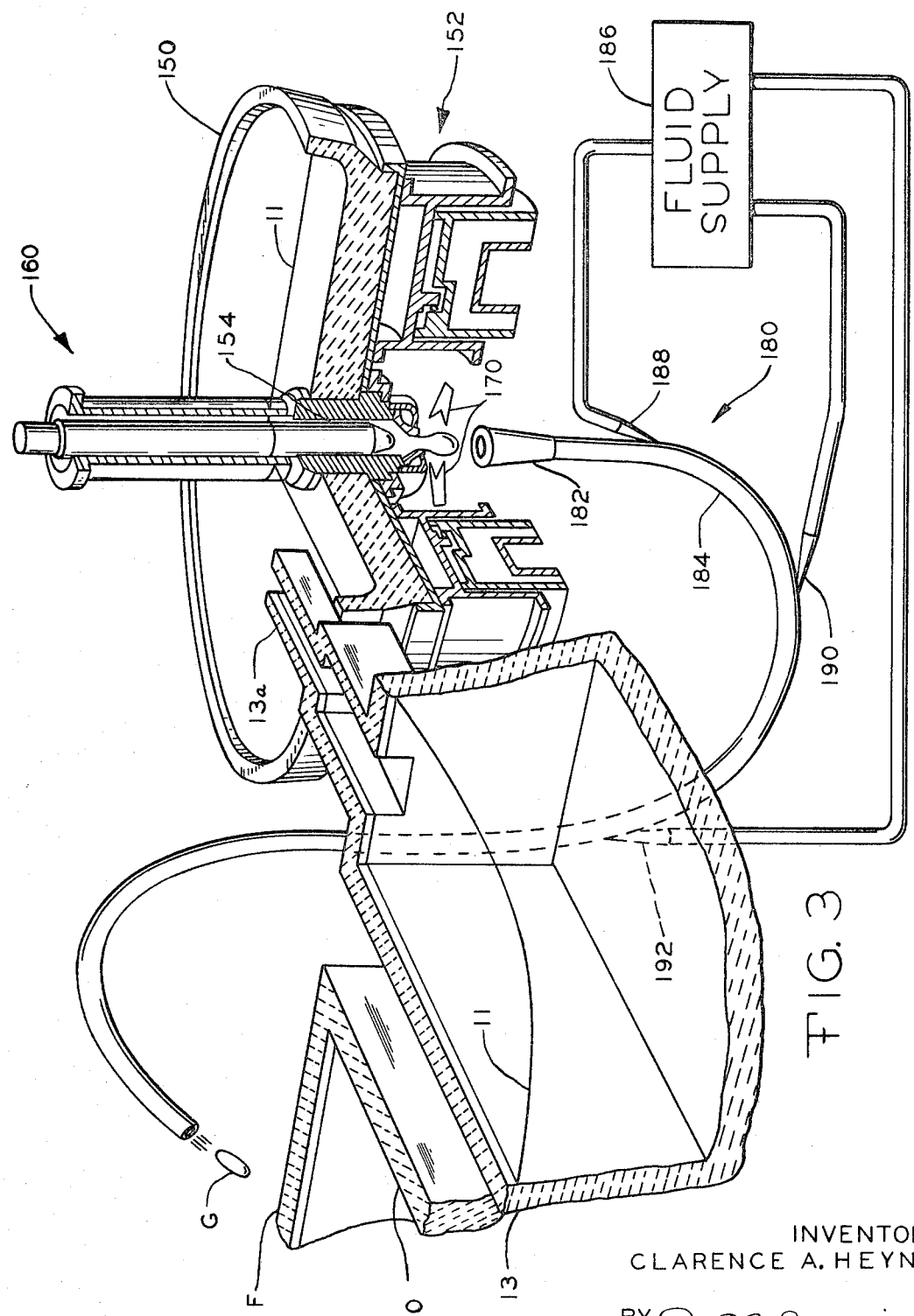

United States Patent Office 3,732,086
Patented May 8, 1973

3,732,086
METHOD AND APPARATUS FOR RECOVERING
DISCRETE GOBS OF MOLTEN GLASS
Clarence A. Heyne, Toledo, Ohio, assignor to
Owens-Illinois, Inc.
Filed Dec. 28, 1970, Ser. No. 101,845
Int. Cl. C03b 5/26
U.S. Cl. 65—28
14 Claims

ABSTRACT OF THE DISCLOSURE

Embodiments are disclosed of means for recovering discrete gobs of molten glass for reuse. A conduit has an entrance end located to receive the discrete gobs of molten glass from a gob feeding means and an exit end positioned to deliver recovered gobs received by the conduit to a molten glass supplying means. The discrete gobs are conveyed through the conduit means by supplying fluid under pressure or creating a vacuum in the conduit to urge the discrete gobs to the melting tank of a furnace. The gob recovery system may be utilized with IS molding machines, Owens pot process machines, and the like. Whenever the discrete gob forming apparatus is utilized with the Owens pot process equipment, the flow of glass through the pot may be positively metered to provide better homogeneity in the molten glass in the pot.

BACKGROUND OF THE INVENTION

While the invention will be described specifically with respect to the manufacture of glass containers and more specifically to apparatus designed to mold glass containers, it will become apparent from the description that the invention is applicable to other manufacturing processes utilizing molten glass for forming molded objects.

In the past whenever the distributing mechanism of an IS molding operation has been rendered inoperative, either manually or by failure in the reciprocating mechanisms, the discrete gobs of glass formed by the gob feeder apparatus have been dropped onto a chute which receives the gobs or mold charges issuing from the feeder mechanism and conveys them to a dump or cullet pit. While the glass in this cullet pit may be reconditioned and reused it is sometimes contaminated and must be disposed of as solid waste. Further, when the gobs are disposed of via the cullet chute the batch feeder mechanism of the process is handling more tonnage than necessary to supply glass batch to replace that continuously being fed from the gob feeding mechanism.

In the Owens pot process a central drain has been utilized so that a molten glass flow could be established within the pot which, in conjunction with the rotation of the pot, enabled a better homogeneity of the molten glass being picked up during the mold dipping operation. The molten glass issuing from the drain of the revolving pot was again directed to a dump or cullet pit, with the waste and reconditioning problems again resulting as discussed above with respect to the IS process.

In addition, in the Owens process because of the revolving of the pot, the mold dipping in the pot, and other problems it is sometimes difficult to establish a constant amount of flow through the central drain of the pot. Thus, the surface level in the pot could raise or lower slightly from a desired predetermined level and the flow pattern in the revolving pot could not be controlled as well as desired.

Accordingly, it is an object of this invention to provide an improved process for manufacturing glassware.

It is a further object of this invention to provide a method and apparatus for manufacturing glassware which permits the batch system to handle a substantially fewer number of tons of glass batch per day.

It is a further object of this invention to provide an improved method and apparatus for manufacturing glassware in which waste glass is recovered and returned to the process with little loss of temperature and no contamination.

It is a further object of this invention to provide an improved method and apparatus for circulating glass in a glass manufacturing process to enable an increase in the glass circulation to improve the conditioning and homogeneity of the molten glass, and to recover the circulating glass for reuse directly to the melting tank with little loss of temperature.

SUMMARY OF THE INVENTION

The above objects of the invention have been illustrated herein in preferred embodiments of apparatus which carry out a method for recovering unused discrete gobs of molten glass for reuse. One end of a conduit means is located to receive unused discrete gobs after the gobs are formed but before the gobs are contaminated. The other end of the conduit means is located at a melting tank for producing molten glass. The gobs received by the conduit are conveyed to the melting tank by changing the fluid pressure in the conduit means to urge the gobs therethrough. The fluid pressure may be changed by supplying fluid under pressure behind the gobs to push them through the conduit. Alternatively, a vacuum mechanism may be connected to reduce the pressure in the conduit ahead of the gob causing the atmospheric pressure to push the gob through the conduit. An additional desirable step is described and means are shown for carrying out the step of supplying a lubricant to the conduit means to ease the conveying of the gobs therethrough.

In recovering and recirculating the molten glass gobs as described herein it was also discovered that the use of a gob feeder mechanism in the drain aperture of a pot in the Owens process enabled a positive feeding and metering of the molten glass through the drain aperture and thus enabled an improvement in the conditioning and the homogeneity of the molten glass in the pot available for the mold dipping operation.

Other objects, advantages and features of this invention will become apparent when the following description is taken in conjunction with the accompanying drawings, in which:

FIG. 3 is a view in perspective, partially in section, illustrating the application of the teachings of this invention to a second glass manufacturing process.

DESCRIPTION OF THE PREFERRED EMBODIMENTS

Figure 1:
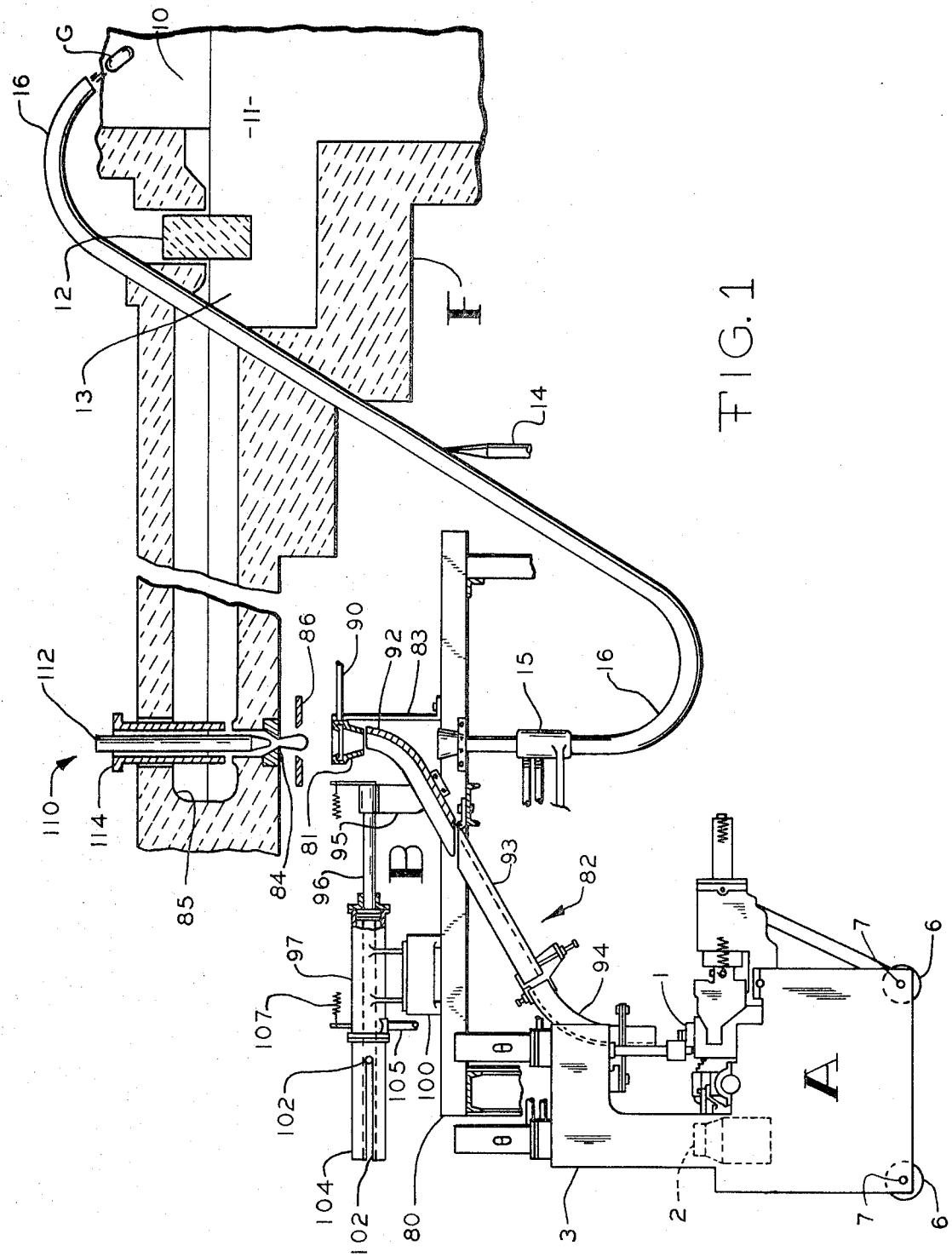
FIG. 1 is a side elevational view of a glass working apparatus, partially in section, constructed in accordance with the invention.
Figure 2:
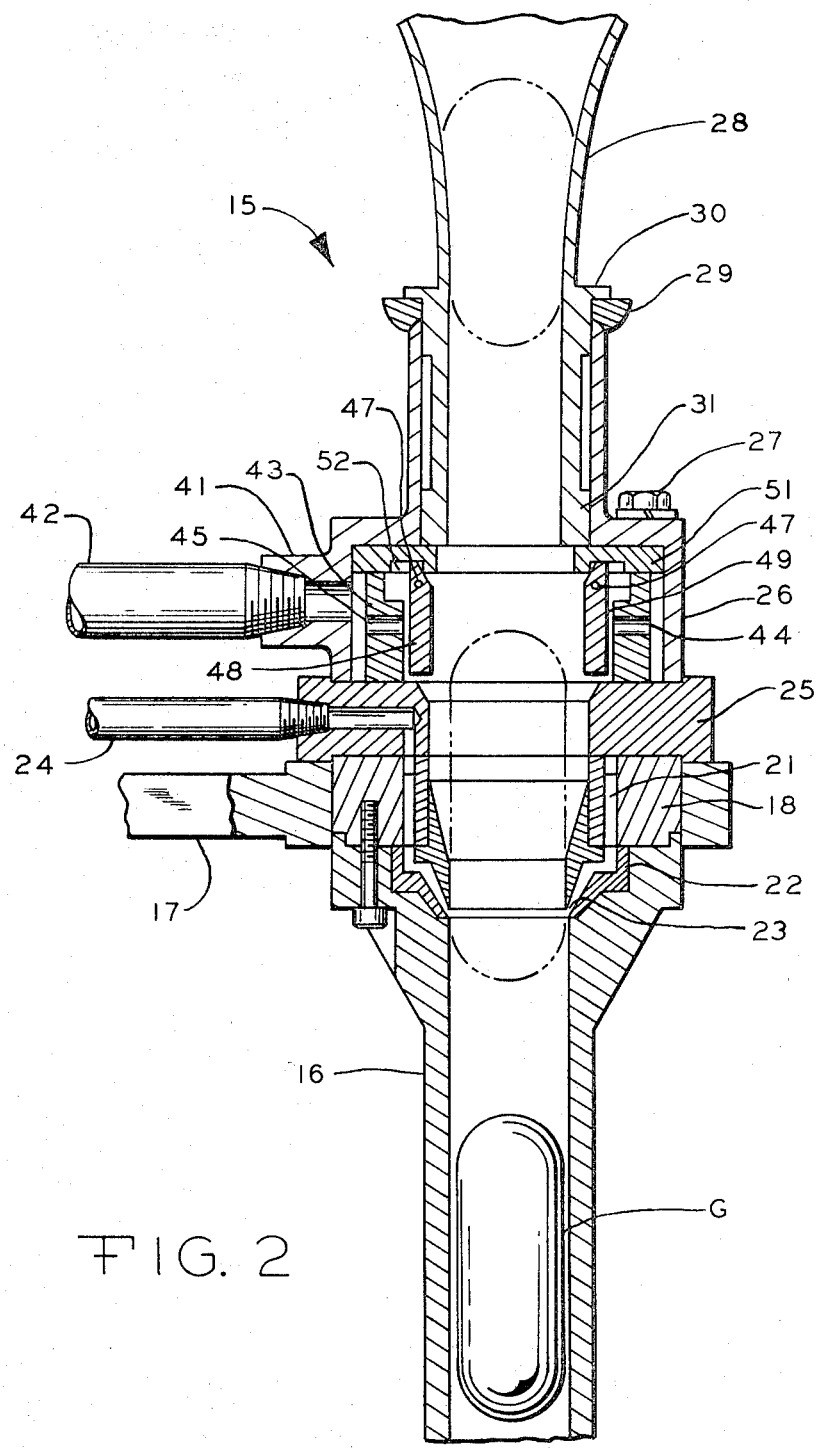
FIG. 2 is an enlarged elevational, partially in section, view of a portion of the gob conveying apparatus.

Referring to FIGS. 1 and 2 there is illustrated glass working apparatus embodying the present invention which comprises a plurality of shaping machines or individual sections A (only one of which is shown), each embodying a single stationary blank mold and a single movable blow mold, each of the machines being capable of independently performing a complete molding operation. A delivery mechanism B is shown for successively supplying the plurality of shaping machines with mold charges of predetermined size and shape from a single glass feeding device.

Each of the sections A embodies a blank mold 1 which is disposed in a permanently inverted position at the blank-forming station, and a blow mold 2. The molds 1 and 2 are carried by a frame 3 which is advantageously mounted on wheels or rollers 6 on axles 7.

The operation of shaping machines of this type is well known in the art will not be described in detail here. Reference is made to U.S. Pat. No. 1,843,159 for details of the operation of each of the individual sections or machines A.

Molten glass for forming the gobs or charges is provided by a furnace F constructed in a known manner with insulated refractory and having a plurality of burners in the melting tank 10 for reducing glass batch to a molten pool 11. A skimmer 12 may be interposed between the melting tank 10 and the refining and conditioning section 13. The conditioning section may be a forehearth-feeder alone, or include separate refining and forehearth section as known in the art. Although not shown, it is within the scope of this invention to provide a shadow wall between the melting tank and the refining section to assist in the refining of the glass before the molten glass enters the forehearth.

The delivering mechanism B which conveys the mold charges to the several shaping machines A is supported by suitable frame structure 80 and comprises a funel element 81 and a plurality of guideways designated generally at 82, which may extend radially from the funnel element 81 to the several shaping machines. The funnel 81 is supported by a bracket 83 beneath an outlet or orifice 84 in the end of the forehearth 85.

A glass feeding mechanism designated generally at 110 comprises a reciprocable plunger 112 located above and aligned with the orifice or aperture 84, the plunger having its lower end in the molten glass. A rotatable tube 114 is located concentric with and around the plunger 112 and also has its lower end in the molten glass. The glass feeding mechanism 110 is adapted to deliver molten glass in successive mold charges or gobs of predetermined size and shape, which are cut off by a suitable shearing device 86, in a manner well known in the art.

The surface of the funnel 81 is lubicated by air or steam under pressure which may be projected over the surface thereof from an annular chamber mounted on the upper edge of the funnel. The lubricating fluid under pressure is supplied to the chamber from a pipe 90 which leads from a convenient source of supply.

Each of the guideways 82 comprises a horizontally reciprocable trough section or distributor 92 which intercepts the mold charges issuing from the funnel 81 at the gob receiving position shown in FIG. 1, a vertically adjustable trough section 92 which conveys the mold charges to the shaping machine, and a laterally adjustable deflector 94 which directs the mold charges accurately into an awaiting mold.

Each of the distributors 92 is carried by a bracket 95, which is mounted on one end of a horizontal reciprocable piston rod 96. The piston rod 96 extends entirely through a fluid pressure cylinder 97, which is mounted upon a bracket 100 attached to the frame structure 80. The piston rod 96 is prevented from rotating and displacing the trough 92 by means of a pin 102 which extends transversely through the other end of the piston rod 96 for engagement with slot 103 formed in a tubular housing 104 on the head of the cylinder 97.

The trough or distributor section 92 is projected in a rectilinear path to a position beneath the funnel 81 and in alingment with the trough section 93 in order to deliver a mold charge to the shaping machine, by means of fluid pressure, which is admitted to the cylinder 97 from a pipe 105. The pipe 105 may be provided with a valve in order to regulate the admission of air to the cylinder 97 and the operating speed of the trough 92. At the conclusion of a delivery operation, and as soon as the pressure within the cylinder 97 has been relieved, the trough section 92 is withdrawn from an operative or gob receiving position with respect to the funnel 81 and the trough section 93, by means of a spring 107 which is secured at one end of the piston rod 96 and at the other end to the cylinder 197. The spring 97 positively maintains the trough section 92 in a retracted position with respect to the outlet of the gob feeder when the operation of the machine is discontinued or in the event of failure in the pressure supply to cylinder 97. It will be understood in this connection that the troughs 92 of the several guideways are operated in succession and in timed relation with respect to the action of the feeding device in order to deliver mold charges successively to the several shaping machines.

In the prior art a chute was carried by the frame 80 with its upper end in position beneath the funnel 81 and the outlet of the feeding mechanism, and was adapted to receive mold charges or gobs issuing from the feeding mechanism and convey them to a pump or cullet pit in the event that none of the distributing troughs 92 were in position to intercept them.

In the present invention a conduit or conveyor tube 16 is positioned with an entrance end below the funnel 81 and the gob receiving position of the distributor 92. If the distributor 92 is not in position to receive a gob issued by the feeder mechanism 110, the gob falls by gravity into the entrance end of the tube 16 and is conveyed therethrough to an exit end which is advantageously located to discharge the gob G into the melting tank 10. Although it is possible to discharge the gob G in the refining and conditioning area and obtain some of the advantages of this invention, it would put more of a burden on the burners and controls in the forehearth and refining areas to condition the gobs G that were discharged therein.

The gobs G are conveyed or urged through the conduit 16 by changing the fluid pressure within the tube. That is, pressure in front of the gob may be reduced causing atmospheric pressure at the entrance end of the tube 16 to push the gob through the conduit. Alternatively, fluid under pressure may be supplied behind the gob in tube 16 to convey or push the gob therethrough.

Referring to FIG. 2 there is shown an enlarged cross-sectional view of a station for receiving, supplying lubrication for and applying fluid pressure behind a gob to convey it through tube 16.

A support arm 17 is suitably connected at one end to a portion of the frame and at its extending end is provided with a circular opening within which is seated a manifold ring 18. The manifold ring 18 has bolted to its under-surface the conveyor tube 16. The manifold ring 18 has a plurality of vertical passages 21 formed therein which extend throughout the full height of the ring and communicate at their lower ends with complementary openings formed in a spray ring 22.

The spray ring 22 has an internal, annular surface which tapers inwardly and serves as a final guiding funnel for the gob just prior to the movement of the gob into the tube or conduit 16. The spray ring 22 has its passages arranged with outlet nozzle passages 23 directed downwardly and inwardly toward the inside of the tube 16.

Lubricant is supplied to the manifold ring 18 and to the spray ring 22 from a source (not shown) through a pipe 24 connected to an opening in an annular base 25. The base 25 is mounted on the support arm 17 in overlying relationship with respect to the manifold ring. The base 25 is provided with internal passages communicating with passages 21 in the manifold ring. Thus it can be seen that lubricant supplied through the pipe 24, under predetermined pressure, will spray the interior of the tube 16. The sequence of operation or introduction of the lubricant may be timed such that the spray will impinge on the outside of the gob as it falls through the spray ring.

The base 25 has a hollow cap 26 mounted thereon in axial alignment with the opening through the base 25.

The cap 26 is secured to the base 25 by a series of bolts or screws 27. The upper portion 29 of the cap 26 is of somewhat smaller cross-sectional dimension than the lower portion, with the upper portion 29 serving as a support for an annular gob guide 28 which is preferably funnel-shaped to catch the gob issuing from funnel 81.

The gob guide 28 is provided with a radially extending annular flange 30 which rests on the upper surface of the cap portion 29. The lower end of the gob guide 28 is provided with an annular, radially extended boss 31 which closely fits within the interior of the upper portion 29 of the cap 26. In this manner the gob guide is assured of being vertically mounted with its axis symmetrically arranged with respect to the vertical axis of the entrance end of the tube 16.

Within the cap 26 a fluid pressure responsive valving arrangement is provided. The cap 26 is provided with an internally threaded nipple 41 through which an internally threaded pipe 42 is attached. The pipe 42 in turn is connected to a source (not shown) of air or other suitable fluid under pressure. Symmetrically located within the lower portion of the cap 26 and having an external diameter less than the internal diameter of the cap 26 is a frame 43. The frame 43 is provided with vertical slots in its exterior surface which cooperate with the screws 27 to serve to retain the frame centrally with respect to the interior of the cap 26 and prevent rotation or displacement of the frame relative to the cap. The space provided between the frame and the cap serve as a manifold passage for air or fluid.

Pairs of substantially horizontal openings 44 and 45 are provided at diametrically opposed sides of the frame 43. The internal configuration of the frame 43 at the location where the pairs of openings 44 and 45 enter, present generally flat, vertical planes. The upper edge of the frame 43 is formed with opposed pairs of horizontal notches which serve as bearings for hinge pins 47 carried by a pair of swing plates 48 and 49. With the swing plates 48 and 49 mounted within the frame 43 by their pins 47, the plates will hand vertically downward in the position shown in FIG. 2. The previously described vertical, planer surface formed on the inner faces of the frame 43 have centrally relieved portions within which the inner ends of the openings 44 and 45 are located, thus providing a small chamber behind each of the swing plates 48 and 49.

A valve seat or plate 51 overlies the upper edge of the frame 43 and serves as a means for limiting the upward swing of the swing plates 48 and 49 to a horizontal position. The valve seat 51 is formed with horizontal notches 52 in the undersurface thereof, which provide clearance for the portions of the swing plates which extend upwardly beyond the hinge pin axes when the plates are in the vertical position, as shown in FIG. 2.

Introduction of air under pressure through the pipe 42 will cause air to enter the cap 26 in surrounding relationship with respect to the frame 43. The air will pass through the openings 44 and 45 to effectively swing the swing plates 48 and 49 into the valve closed position. With the plates closed, the passage of air upwardly from the interior of the frame 43 is substantially prevented. The air, therefore, will pass downwardly through the spray ring and to the top of the tube 16 to effectively urge or push the gob into and through the tube 16 back to the melting tank 10. When the air supply is shut off or discontinued, the swing plates will swing back to their original position under the influence of gravity.

The operation of the fluid station 15, as just described, may be initiated in response to the receipt of a gob G at station 15. The detection of the receipt of the gob G may be accomplished by sensing whether or not a distributor chute 92 is in gob receiving position when the shear mechanism 86 is operated to provide a discrete gob.

It should be noted that although station 15 will provide sufficient conveying force for the gobs in most instances, one or more booster stations, as indicated by the nozzle 14, may be provided between the entrance and exit ends of conduit 16.

Referring to FIG. 3 there is illustrated, in a diagrammatic view in perspective, apparatus for carrying out the manufacture of glassware through the use of the Owens pot process. For the purpose of clarity various parts of the structure and mechanisms which are already known to those skilled in the art, and which are not a part of the present invention, have been deleted from FIG. 3 for the purpose of clarifying the operation of the invention.

A furnace F is again supplied with a melting tank 10 which melts glass batch and flows the resultant molten glass pool 11 to a refining or conditioning section 13. The conditioning section 13 discharges refined and conditioned glass through trough 13a into a revolving pot 150. In this process the glass flows from the conditioning section 13 to an alcove, usually a channel integral with the refiner, of the same depth, but having the nature of a narrow channel. Separate burners may be used in the alcove for controlling the temperature of the conditioned glass. Leaving the alcove, the glass flows through the trough 13a, which may be provided with a gate at its entrance to control the rate of flow. While the beginning end of the trough 13a is essentially enclosed within the refiner or alcove housing, its exit end is enclosed in the pot housing. In between, it is largely open except for refractory used to cover the glass channel.

The pot assembly has its own complete and independent housing, firing system, controls, etc. The pot 150 revolves upon a turntable generally designated at 152. The pot revolves entirely within its housing except for one part of its perimeter where the pot comes out from under an arch and is exposed to allow machine molds to dip in and gather glass. The rotation or revolution of the pot is at a predetermined speed, preferably synchronized with the mold dipping, to avoid repeat mold dipping at the same glass spot on consecutive revolutions to enable the molds to gather glass having a better homogeneity.

It has further been discovered that by providing a drain aperture 154 in the pot 150 a glass flow within the pot can be set up which, in conjunction with the revolving of the pot 150 at the synchronized speed, provides for an even better homogeneity of the glass to be gathered by the molds as they dip into the pot.

While the provision of a centrally located aperture, orifice or drain did improve the homogeneity it was discovered that due to several factors the flow rate through the centrally located aperture was not constant. Thus, a variation in surface level of the molten glass 11 in the pot 150 may occur. The most desirable state of homogeneity of molten glass may not be obtained.

In this invention the flow of the molten glass through the drain aperture or orifice 154 is controlled by a charge feeding mechanism 160, similar in operation and construction to that noted at 110 in FIG. 1, which in cooperation with a shear means diagrammatically designated at 170 provdes positive metered mounts of flow in discrete gobs of a predetermined size.

As noted hereinbefore, the drain of the molten glass from aperture 154 previously was directed to a dump or cullet pit from whence it was taken to be reused if it had not become contaminated. However, this caused the glass batch feeding mechanism, which is providing batch to the furnace F, to supply that extra amount of batch which was flowing from the central aperture 154 to the cullet pile in excess of that actually needed for the mold dipping operation.

To improve the operation of the process just described a recovery and reuse mechanism designated generally at 180 has been provided. A funnel 182 is located beneath the gob severing mechanism 170 to receive the discrete gobs and direct them to the entrance end of the conduit 184. The exit end of the conduit 184 is again advantageously positioned to discharge the gob G into the melting tank 10. A fluid supply 186 is connected via nozzle 188 to supply fluid under pressure to urge or convey the gob through the conduit 184. Additional nozzle stations 190 and 192 may be provided if desired or necessary to adjust the speed or control the action of the gob G in the conduit 184. The fluid supply 186 may be made a continuously pulsating fluid supply timed in conjunction with the release of the gobs from the shear mechanism 170. Alternatively, the fluid supply 186 may provide a steady stream or jet from each nozzle to convey the gob G.

Since the change of pressure in the conduit 184 is a result of adding fluid under pressure, it is advantageous to dispose the nozzles 188, 190, 192 so that the jets will issue therefrom in the direction of travel of the gob in the conduit 184.

There has thus been illustrated in FIG. 3 method and apparatus for metering the center drain of the pot 150 and returning the glass to the furnace melter with very little loss of temperature. The amount of center drain can be accurately controlled. More center drain can be used, since the gobs are being returned to the melter, to im-improve the quality of the molten glass in the pot 150. By returning the flow of glass from the center drain to the melter the batch system may be relieved of handling a substantial amount of batch per day.

It should be noted that the apparatus of FIG. 3 may be operated by changing the fluid pressure in the conduit 184 to convey the gobs G therethrough by providing vacuum sources. This modification of FIG. 3 would be obvious in view of the teachings herein in that the major vacuum source would be advantageously located closely adjacent the exit end of the conduit 184 while booster vacuum sources could be located intermediate the exit end and the entrance end.

In conclusion, it is pointed out that while the illustrated examples constitute practical embodiments of my invention, I do not limit myself to the exact details shown since modification of these details may be made without departing from the spirit and scope of this invention.

I claim:
1. Apparatus for manufacturing objects from glass comprising,
   (a) means for supplying molten glass;
   (b) means connected to said molten glass supplying means for feeding discrete gobs of molten glass to the exterior of said molten glass supplying means; and
   (c) means for recovering discrete gobs of molten glass for reuse including conduit means having an entrance end located exterior of said molten glass supplying means to receive discrete gobs of molten glass from said gob feeding means and an exit end positioned to deliver recovered gobs received by said conduit means to said molten glass supplying means, and means for changing fluid pressure in said conduit means to urge discrete gobs through said conduit means.

2. Apparatus as defined in claim 1 which further includes means for supplying lubricant to said conduit means to aid the passage of discrete gobs therethrough.

3. Apparatus as defined in claim 1 in which said fluid pressure changing means includes means for supplying fluid under pressure to said conduit means, and which further includes means for preventing any subtsantial back flow through said entrance end of said fluid under pressure in said conduit.

4. Apparatus as defined in claim 3 in which said back flow prevention means includes plate valve means responsive to the supplying of fluid under pressure to said conduit means.

5. Apparatus as defined in claim 4 in which said back flow prevention means includes fluid nozzle means for supplying said fluid under pressure in said conduit, said fluid nozzle means being connected to said conduit means to direct a jet of fluid through said conduit means in the direction of travel of said discrete gobs.

6. Apparatus as defined in claim 1 in which said fluid pressure changing means includes means for supplying fluid under pressure to said conduit means at a plurality of spaced locations along said conduit means.

7. Apparatus as defined in claim 1 in which said molten glass supplying means includes
   (a) a melting section for melting glass batch, and
   (b) a molten glass conditioning section connected intermedate said melting section and said gob feeding means,
   (c) said discharge end of said conduit means being positioned to deliver recovered discrete gobs to said melting section to assure proper conditioning before reuse.

8. Apparatus for manufacturing molded objects from molten glass comprising,
   (a) means for supplying molten glass;
   (b) means connected to said supplying means for feeding discrete gobs of said molten glass to the exterior of said molten glass supplying means;
   (c) means for molding said discrete gobs of molten glass into glass objects;
   (d) means for selectively directing said discrete gobs of molten glass from said gob feeding means to said molding means;
   (e) means for recovering for reuse discrete gobs of molten glass including conduit means having a gob entrance end located exterior of said molten glass supplying means to receive discrete gobs from said gobs feeding means when said gobs are not directed to said molding means and an exit end located to deliver recovered gobs to said means for supplying molten glass, and means for changing fluid pressure in said conduit means to convey said recovered gobs through said conduit means.

9. Apparatus as defined in claim 8 in which
   (a) said molding means comprises a plurality of molding stations,
   (b) said selectively directing means comprises a like plurality of distributing means each having a gob receiving end which is reciprocable into and out of a position beneath said gob feeding means, and in which
   (c) said entrance end of said conduit means is located below said gob feeding means and below the gob receiving position of said distributing means to enable an automatic recovery of discrete gobs when a distributing means is not reciprocated into the gob receiving position.

10. Apparatus for continuously providing a constant supply of molten glass which is continuously conditioned for machine molds comprising
   (a) means for continuously melting glass batch;
   (b) means for conditioning said molten glass batch;
   (c) pot means for continuously receiving said conditioned molten glass;
   (d) means for rotating said pot means past a mold dip station;
   (e) said pot means having a drain orifice formed therein to cause flow of said molten glass in said pot means to insure homogeneity of said molten glass for each mold dip operation; and
   (f) means for positively metering the flow of glass through said drain means to insure a constant drain from said pot means including a reciprocable plunger mounted above and aligned with said drain orifice with a lower end in said molten glass means for reciprocating said plunger, and a rotatable tube concentric with said plunger and having a lower end in said molten glass.

11. Apparatus as defined in claim 10 which further includes
   (a) conduit means having one end located to receive said severed discrete gobs and another end located to deliver said discrete gobs to said glass batch melting means, and (b) means for supplying fluid under pressure to said conduit means to convey said discrete gobs through said conduit means to said melting means.

12. Apparatus for providing molten glass for a dip molding process comprising,
(a) pot means for receiving conditioned molten glass,
(b) said pot means having aperture means formed therein to control flow of molten glass within said pot means to provide homogeneity for each dip operation,
(c) means for rotating said pot means past a mold dip station, and
(d) means for positively enhancing flow from said pot means through said aperture means including means located at said aperture means for continuously forcing molten glass through said aperture means to insure a constant flow of molten glass from said pot means through said aperture means.

13. A method for recovering unused discrete gobs of molten glass for reuse in a melting tank comprising the steps of (a) receiving unused discrete gobs directly from a gob forming means in one end of a conduit means, and
(b) conveying gobs received by said conduit means to said melting tank by adjusting fluid pressure in said conduit means to create a conveying force in said conduit means and urge gobs therethrough.

14. A method as defined in claim 13 which further includes the step of supplying a lubricant to said conduit means to ease the conveying of gobs therethrough.

References Cited
UNITED STATES PATENTS

| | | | |
|---|---|---|---|
| 984,974 | 2/1911 | Severim | 65—324 |
| 1,742,098 | 12/1929 | Rankin | 65—304 X |
| 2,344,464 | 3/1944 | Lauck | 65—340 X |
| 3,231,357 | 1/1966 | Pither | 65—126 X |

ARTHUR D. KELLOGG, Primary Examiner

U.S. Cl. X.R.

65—125, 126, 165, 304, 331